Oct. 20, 1936.   A. J. SINCLAIR   2,058,266
CONTROL FOR HYDRAULIC VEHICLE BRAKING SYSTEMS
Filed May 29, 1930   2 Sheets-Sheet 1
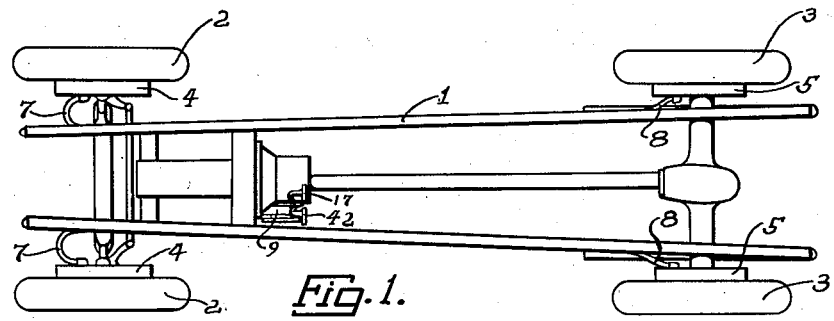
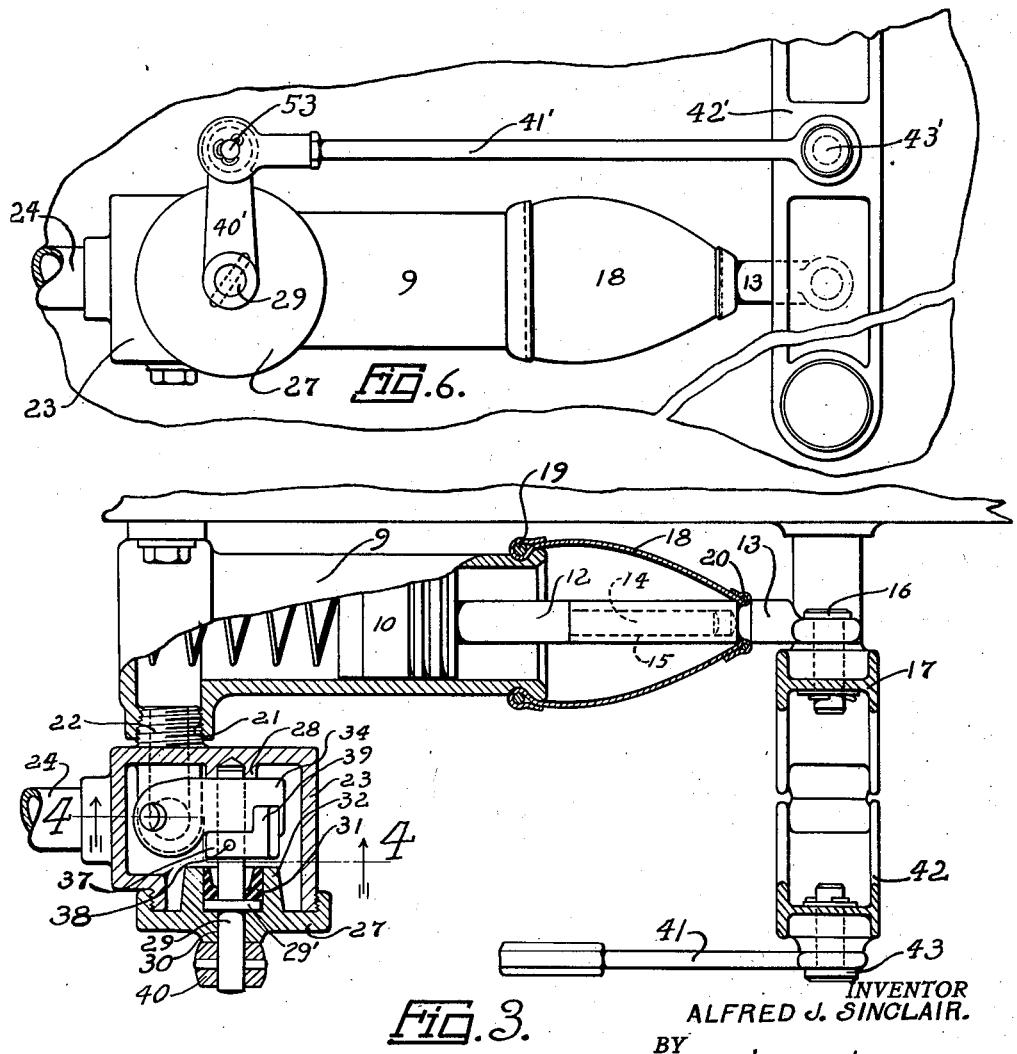
INVENTOR
ALFRED J. SINCLAIR.
BY
ATTORNEY Oct. 20, 1936.   A. J. SINCLAIR   2,058,266
CONTROL FOR HYDRAULIC VEHICLE BRAKING SYSTEMS
Filed May 29, 1930   2 Sheets-Sheet 2
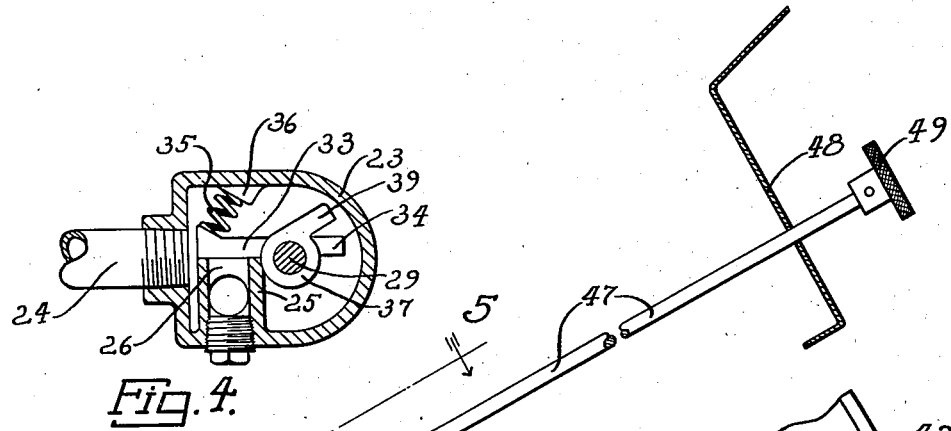
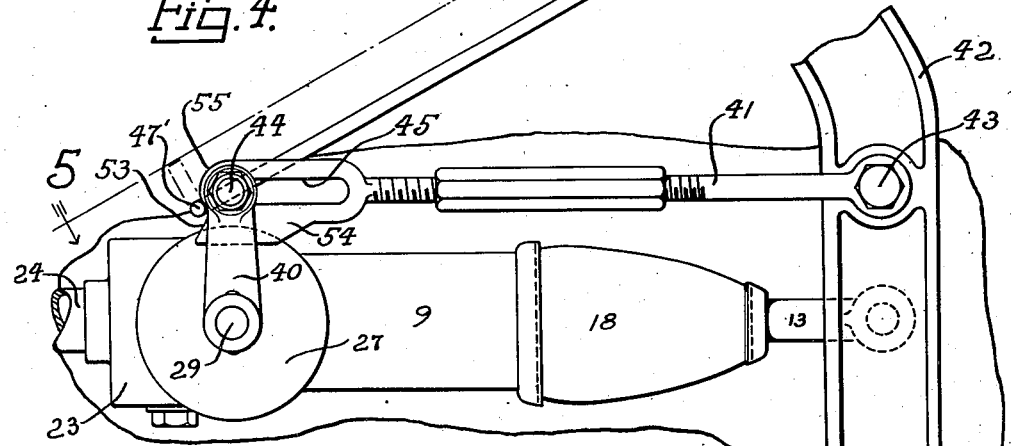
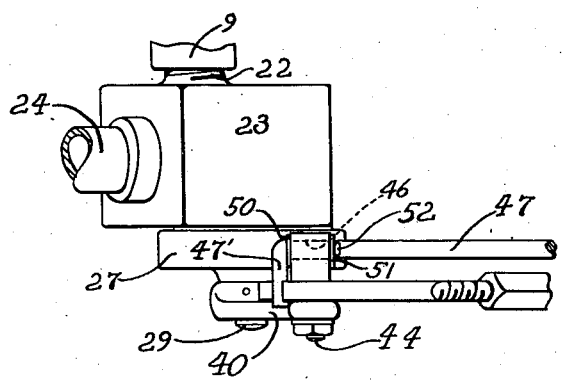
INVENTOR
ALFRED J. SINCLAIR.
BY
ATTORNEY Patented Oct. 20, 1936

2,058,266

UNITED STATES PATENT OFFICE 2,058,266

CONTROL FOR HYDRAULIC VEHICLE BRAKING SYSTEMS

Alfred J. Sinclair, Detroit, Mich., assignor to Chrysler Corporation, Detroit, Mich., a corporation of Delaware Application May 29, 1930, Serial No. 457,260

9 Claims. (Cl. 192—13)

This invention relates to a hydraulic vehicle braking system and particularly to improved control mechanism therefore.

Heretofore, in vehicle braking systems serious difficulties have been encountered in preventing down hill rolling of a vehicle during shifting of the transmission gears and starting of the motor of a vehicle after it has stalled on an inclined road. When vehicles of conventional constructions are on an inclined road or hill, the gear shifting operation requires the driver to both manipulate the accelerator and depress the brake pedal with his right foot and on starting the engine under this condition the brake must be held and the accelerator and starter control have to be operated in rapid sequence, all by the driver's right foot. The vehicle generally starts to roll down hill as soon as the brake pedal is released and before the driving effect of the engine is transmitted through the transmission gears and clutch to the road wheels. This action results in an unsafe performance and complicated operations of the various controls under precarious road conditions.

The main objects of this invention are to provide improved means in a vehicle braking system for continuing the application of the brake shoes thereof to their respective drums after the brake pedal has been released; to provide means of this kind which is controlled by the clutch pedal of a vehicle; to provide a check valve and operating mechanism therefor in a hydraulic braking system which is inoperative when the clutch pedal of the vehicle is out so as to allow normal operation of the brakes by the brake pedal; to provide a valve of this kind which will retain the hydraulic pressure that is built up in the system by depression of the brake pedal after the latter is released when the clutch pedal is held in a predetermined position so as to continue the application of the brakes while permitting the right foot of the driver to manipulate other controls, such as the accelerator and starter control; and to provide manually operable means for rendering the check valve inoperative for all positions of the clutch pedal.

An illustrative embodiment of this invention is shown in the accompanying drawings, in which:

Fig. 1 is a plan view of a vehicle chassis which is equipped with my improved hydraulic braking system.

Fig. 2 is a side elevation of a master cylinder of the braking system showing a valve and valve actuating mechanism embodying my invention.

Fig. 3 is a plan view, partly in section, of the structure shown in Fig. 2 illustrating the manner in which it is connected to the conventional clutch and brake pedal controls of a vehicle.

Fig. 4 is a vertical section taken on line 4—4 of Fig. 3.

Fig. 5 is a fragmentary perspective view showing the valve and valve actuating mechanism as it appears from above when viewed from line 5—5 of Fig. 2.

Fig. 6 is a side elevation of a master cylinder and valve mechanism showing modified valve actuating apparatus.

In general, the hydraulic braking system is of conventional construction and includes a master cylinder having a piston which is operative by the brake pedal of a vehicle so as to create a fluid pressure in the vehicle brakes when the brake pedal is depressed. In addition to the conventional structure of a hydraulic braking system, a check valve is provided at the outlet of the master cylinder which is releasably held in a closed position so as to prevent the fluid of the system from flowing through the outlet of the cylinder in a reverse direction when the pressure exerted on the piston by the brake pedal is released. This valve is provided with mechanism by which it is selectively rendered inoperative when the clutch pedal of the vehicle with which the mechanism is connected is in its normal rearward position.

In the form shown, the vehicle chassis 1 has front and rear pairs of wheels 2 and 3 respectively on which hydraulic vehicle brakes 4 and 5 are mounted. These brakes are supplied with fluid under pressure by conduits 7 and 8 of a hydraulic braking system which includes a master cylinder 9 having a piston 10 which is provided with an extensible piston rod comprising extensible sections 12 and 13. Section 12 has a pin 14 on its outer extremity which extends into a central aperture 15 in the section 13, the latter section being pivotally mounted at 16 on the brake pedal 17 of the chassis. A flexible boot 18 preferably comprising rubber or leather, clamped at one end on the open extremity of the master cylinder 9 by a ring 19, and at its other end on the outer section 13 of the piston rod by a clamping member 20, forms a shield for the open end of the cylinder.

The master cylinder 9 has an outlet aperture 21 in which a pipe 22 of elbow shape is threaded. The pipe 22 is an integral part of a valve housing 23 which has an outlet 24 communicating with the flexible pipes 7 and 8 of the braking system, the pipe 22 having an upright end portion 25 which is located in the interior of the housing and which has an outlet opening 26. The valve casing 23 has an open side on which a cover 27 is threaded and it is provided on its opposite side with a bearing 28. A shaft 29 extends into the housing 23 through an aperture 30 in the cover 27 and is journaled at its inner end on the bearing 28 and at its intermediate portion in a rubber washer 31 mounted on an annular flange 32 on the inner side of the cover 27 and forming an oil seal which, in accordance with conventional practice for fluid pressure seals, will provide a frictional effect on shaft 29 to accommodate operation of the device as more particularly hereinafter set forth. In this connection it will be noted that the shaft flange 29' is urged by fluid pressure against the casing 27, and that washer 31 in other respects grips shaft 29, casing 27 and flange 29' to prevent fluid leakage. Further frictional effect may be produced at the shaft aperture 30 as is customary for fluid tight shaft bearings.

Journaled on the shaft 29 is a flapper valve 33 which registers at one end with the outlet opening 26 of the pipe 22 and has a tongue 34 on its other end extending beyond the shaft 29 on the side thereof opposite from the flapper valve. The valve 33 is releasably urged to a closed position by a spring 35 which is seated at one end in an aperture of a boss 36 on the inner side of the housing 23 and which bears against the outer end portion of the valve.

A collar 37 is fixed to the shaft 29 by a pin 38 and has a lug 39 which extends over the tongue 34 of the valve so as to rotate the valve in a clockwise direction against the action of the spring 35 when the shaft 29 is rotated in a corresponding direction. The shaft 29 is provided with actuating mechanism including a crank arm 40 and an adjustable link 41 which is pivotally attached at one end to the clutch pedal 42 of the vehicle by a bolt 43, and both pivotally and slidably connected at its other end with the arm 40 by a bolt 44 which extends through an elongated slot 45 formed in the left end of the link 41 as viewed in Fig. 2.

The bolt 44 has an enlarged inner extremity which is provided with an aperture 46 in which a dash control, comprising a rod 47 is journaled. The upper end of the rod extends through an aperture in the dash 48 of the vehicle and is provided with a knob 49 and the lower end portion 47' of the rod is bent substantially at a right angle to the axis of the rod 47 as shown in Fig. 5. The rod 47 is secured against axial movement relative to the enlarged inner extremity or head of the bolt 44 by a washer 50 which bears against the lower end portion 47' of the rod 47, and a washer 51 which is held in place by a cotter pin 52 extending through the rod. The rod 47 may be rotated by manipulation of the knob 49 so as to engage the end portion 47' of the rod against the extremity of the link 41 and the extremity 53 of a flange 54 thereon, the extremity 53 of the flange being inclined and forming a notch, in conjunction with the rounded end 55 of the link, for receiving the end portion 47'.

In operation, with end portion 47' in the solid line position of Fig. 2, when the brake pedal 17 is depressed in the customary manner, the piston 10 is inserted into the cylinder 9 displacing the fluid therein through the outlet 21 of the cylinder and forcing it into the valve housing 23. This action places the fluid in the system under pressure and applies the brakes 4 and 5. When the brake pedal 17 is released while the clutch pedal 42 is in its forwardly extended position, the valve 33 closes the opening 26 of the pipe 25 through which the fluid was admitted and prevents the latter from flowing back into the cylinder. In this manner, the pressure created by the depression of the brake pedal 17 is maintained in the system until the clutch pedal 42 is released and returned to its rearwardly extended position. During rotation of the clutch pedal to its rearward position, the link 41 rotates the crank arm 40 and shaft 29 in a clockwise direction, as viewed in Fig. 2, bringing the lug 39 of the collar 37 into engagement with the tongue 34 of the valve 33. This action opens the valve 33 against the action of the spring 35 and permits the fluid to flow back into the cylinder 9, thus releasing the pressure to which the brakes 4 and 5 have been subjected.

The valve actuating mechanism may be conditioned so as to retain the valve 33 open at all times irrespective of the clutch pedal 42 by rotating the arm 47 until the lower end portion 47' thereof is out of registration with the extremity of the link 41 and in the dotted line position shown in Fig. 2. With the rod in this position during movement of the clutch pedal 42, the link 41 is free to slide forwardly and rearwardly relative to the crank arm 40, the latter being retained in its valve opening position against the action of the spring 35 by the friction which accompanies the formation of the aforesaid liquid tight seal between the casing 23 and the shaft 29 on which the arm 40 is mounted. The arm 40 thus remains in a valve opening position if rotation of the rod 47 occurred while the clutch pedal 42 was in its clutch engagement position. When the rod 47 is rotated to move end portion 47' from the solid line position to the dotted line position of Fig. 2, while the clutch pedal is depressed, the arm 40 may be turned to a valve opening position without changing the position of the clutch pedal by pulling rearwardly upon the knob 49. In either event the pressure in the system is controlled independently by the pedal as in hydraulic braking systems of conventional constructions, when the end 47' is in its dotted line position and when the arm 40 is allowed to remain in the position shown in Fig. 2 by reason of the aforesaid frictional effect at shaft 29.

When the valve actuating mechanism of the clutch pedal is inoperative, the valve 33 may be released by pressing the rod 47 forwardly while maintaining end portion 47' in its upward dotted line position in Fig. 2 so as to condition the valve for maintaining the fluid in the system under pressure while the clutch pedal 43 is depressed and the brake pedal 17 is released, but upon movement of the clutch pedal to its rearward position, the crank arm 40 and shaft 29 together with the collar 37 and lug 39 are rotated in a clockwise direction thereby opening the valve. During following strokes of the clutch pedal 42, the bolt 44 slides in the slot 45 of the link 41 allowing the crank arm 40 and valve 33 to remain open so that the pressure of the system is controlled solely by the brake pedal.

When a vehicle equipped with my improved braking system is driven in hilly country, the dash control rod 47 may be positioned so as to form an operative connection between the clutch pedal 42 and the valve 33. With this setting of the control mechanism, if the vehicle is stopped on a hill for the purpose of shifting gears or because of stalling of the engine, the operator may hold the car against rolling by initially depressing both the clutch and brake pedals and then releasing the brake pedal while holding the clutch pedal down. The depression of the clutch pedal renders the valve 33 operative and prevents the pressure created in the system and applied to the brakes from being reduced when the brake pedal 17 is released. Releasing of the brake pedal frees the operator's right foot so that he may conveniently manipulate the accelerator or the starter control. When the clutch pedal 42 is released for the purpose of effecting a driving connection between the motor and the road wheels, the valve 33 is opened and the fluid pressure is reduced thereby releasing the brakes.

If however, the vehicle is being driven in country in which only an occasional hill is encountered, the control 47 may be set so as to permit free sliding movement between the slotted end of the link 41 and the crank arm 40 as shown in dotted lines in Fig. 1. With this setting, the brake pedal is the sole control of the pressure in the system but when it is desired to maintain the pressure by depression of the clutch pedal 42, the rod 47 may be pressed forwardly while maintaining end portion 47' in its upward dotted line position in Fig. 2 so as to rotate the lug 39 out of engagement with the tongue 34 of the valve permitting the latter to close and hold back the reverse flow of the fluid in the system. As the clutch pedal 42 is released, the valve mechanism is again conditioned to permit independent control of the brakes by the brake pedal.

In the form shown in Fig. 6, the arm 40' of the valve mechanism is pivotally connected at 53 to one end of a link 41' which is pivoted at 43' to a clutch pedal 42'. With this modified construction the valve mechanism is at all times operated in timed relation with the clutch pedal 42', the manual control being omitted.

Although but one specific embodiment of this invention has herein been shown and described, it will be understood that various changes including the size, shape and arrangement of parts may be made without departing from the spirit of my invention and it is not my intention to limit its scope other than by the terms of the appended claims.

I claim:

1. In an automotive vehicle having clutch and brake pedals, a braking system including vehicle wheel brakes, apparatus operable by said brake pedal for applying said brakes, means for maintaining the application of said brakes after said brake pedal has been returned to its released position, mechanism operable by said clutch pedal for controlling said means, and a dash control on said vehicle for rendering said means inoperative for all positions of said clutch pedal and adapted to condition said means for performing only a single operation.

2. In an automotive vehicle having clutch and brake pedals, a hydraulic braking system including means operable by said brake pedal for creating a pressure in said system, mechanism operable by said clutch pedal for controlling the releasing of said pressure independently of said pressure creating means, and a manual control for rendering said mechanism inoperative.

3. In an automotive vehicle having clutch and brake pedals, a hydraulic braking system including means operable by said brake pedal for creating a pressure in said system, a controllable check valve in said system at the outlet of said pressure creating means for maintaining the pressure created therein independently of said pressure creating means, control mechanism operable by said clutch pedal for opening said check valve so as to release said pressure when said clutch pedal is released, and means coacting with said control mechanism for rendering said check valve inoperative so as to allow independent regulation of the pressure in said system by said brake pedal and the pressure creating means associated therewith.

4. In a vehicle having a clutch pedal and a brake pedal, a hydraulic braking system including vehicle wheel brakes, a master cylinder having a fluid outlet, a piston in said cylinder pivoted at one end on said brake pedal for creating a pressure in said system when said brake pedal is depressed, a valve casing having a fluid inlet communicating with the outlet of said cylinder and having a fluid outlet therein communicating with said brakes for supplying fluid under pressure thereto, a shaft journaled in said casing, a flapper valve journaled on said shaft and having an overhanging tongue portion, said valve being in registration with the inlet of said casing, a spring bearing between said casing and said valve for normally holding the latter in closed engagement with the inlet of said casing so as to prevent a reverse flow of fluid therethrough when said brake pedal is released, a collar rigidly mounted on said shaft having a lug thereon registering with said tongue, a crank arm on said shaft and a link pivoted at one end on said crank arm and at its other end on said clutch pedal for rotating said shaft and collar so as to engage the lug of the latter with the tongue of said valve for holding said valve in an inoperative position when said clutch pedal is released.

5. In a vehicle having a clutch and operating means therefor, a hydraulic vehicle braking system including a master cylinder and piston and means for operating the latter so as to create a fluid pressure in said system, a controllable check valve at the outlet of said cylinder, a yieldable member normally holding said valve in a closed position for preventing a reverse flow of fluid from said system, a housing for said valve, a rotatable member journaled in said housing adapted to hold said valve in an open position, and a manual control independent of said clutch operating means for rotating said member so as to release said valve.

6. In combination with a hydraulic vehicle braking system including a master cylinder and piston and means for operating the latter so as to create a fluid pressure in said system, a controllable check valve at the outlet of said cylinder for preventing a reverse flow of fluid from said system, a housing for said valve, a rotatable member journaled in said housing adapted to hold said valve in an open position, a manual control for rotating said member so as to release said valve, and means operable by a vehicle clutch pedal for returning said member to its valve opening position when said clutch pedal is released.

7. In an automotive vehicle having clutch and brake pedals, a hydraulic braking system including means operable by said brake pedal for creating a pressure in said system, a check valve for maintaining the pressure in said system, means for releasably holding said valve in a closed position, a manually operable control member for releasing said check valve, and a member connected with said clutch pedal and with said releasable holding means for automatically returning the latter to a valve opening position when said clutch pedal is released.

8. In a vehicle having a clutch pedal, a hydraulic braking system including means for creating pressure therein, a normally closed check valve for maintaining the pressure created by said means, apparatus connected with said clutch pedal for holding said valve open when said clutch pedal is released and a manually controllable element for selectively conditioning said apparatus to close said check valve upon depression of said pedal.

9. In a vehicle having a clutch pedal, a hydraulic braking system including means for creating pressure therein, a normally closed check valve for maintaining the pressure created by said means, apparatus connected with said clutch pedal for holding said valve open when said clutch pedal is released and a manually controllable element for selectively conditioning said apparatus to close said check valve upon depression of said pedal, said manual control element being adapted to positively move said apparatus to a valve releasing position when said clutch pedal is depressed.

ALFRED J. SINCLAIR.